Jan. 13, 1931.  W. M. VENABLE  1,788,554
CONVEYING APPARATUS
Filed April 18, 1929   3 Sheets-Sheet 1
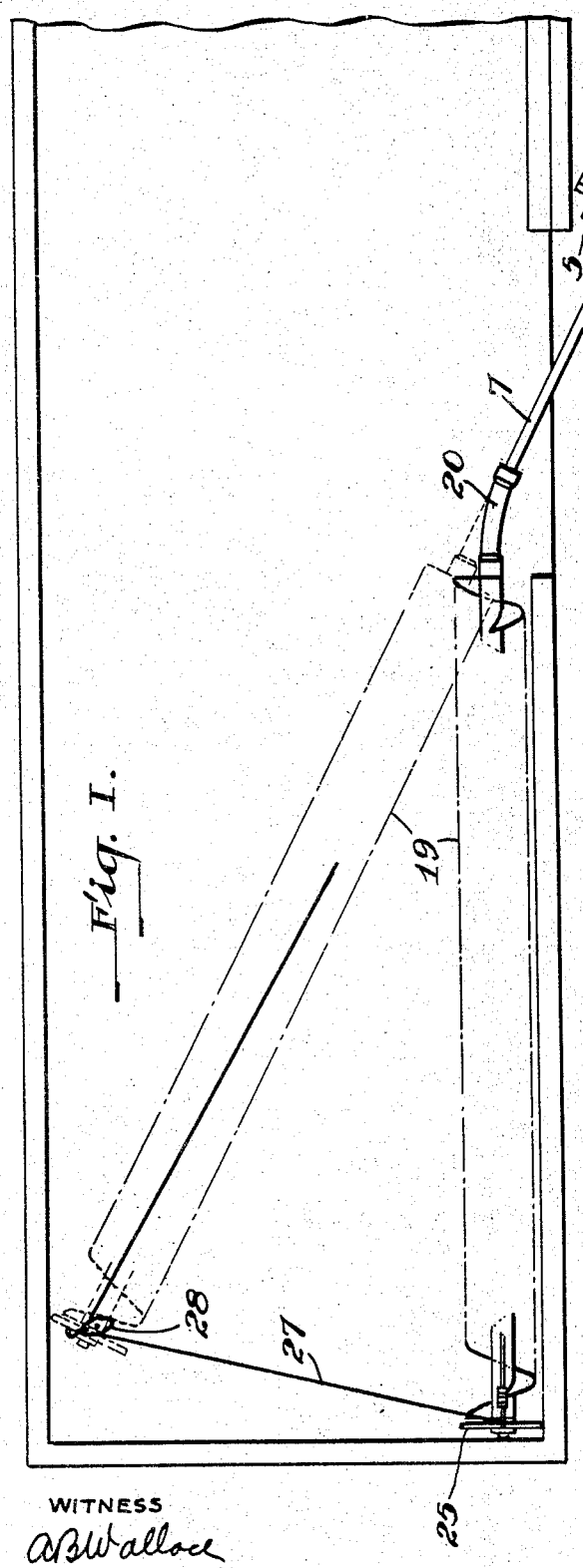
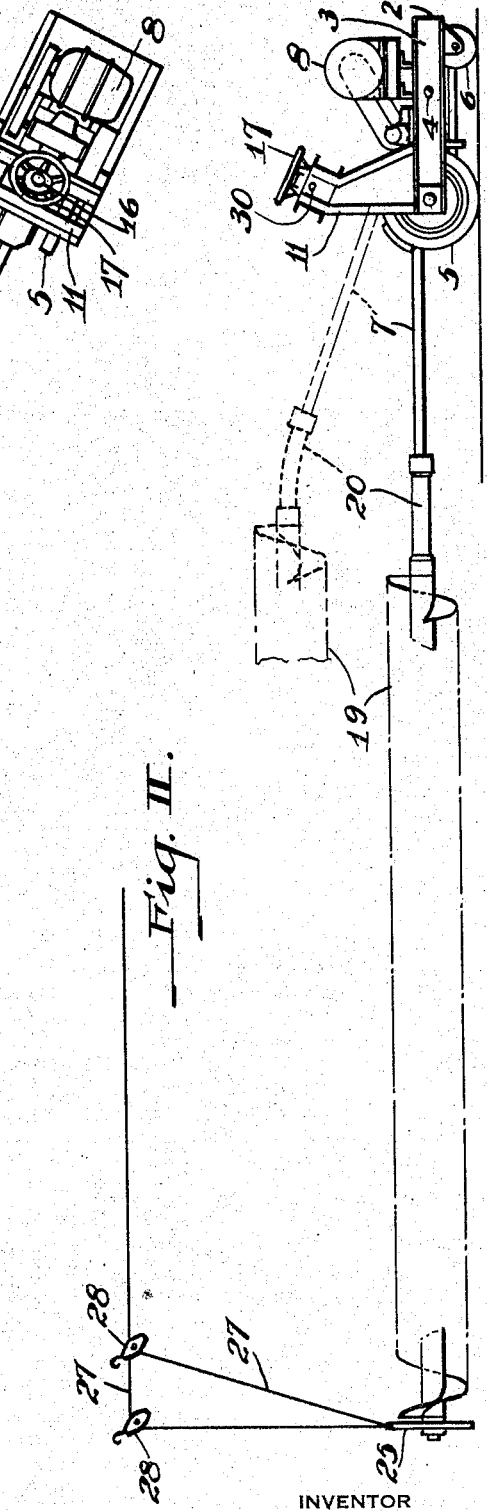
WITNESS
A B Wallock
INVENTOR
William M. Venable
by Christy & Christy
his attorneys

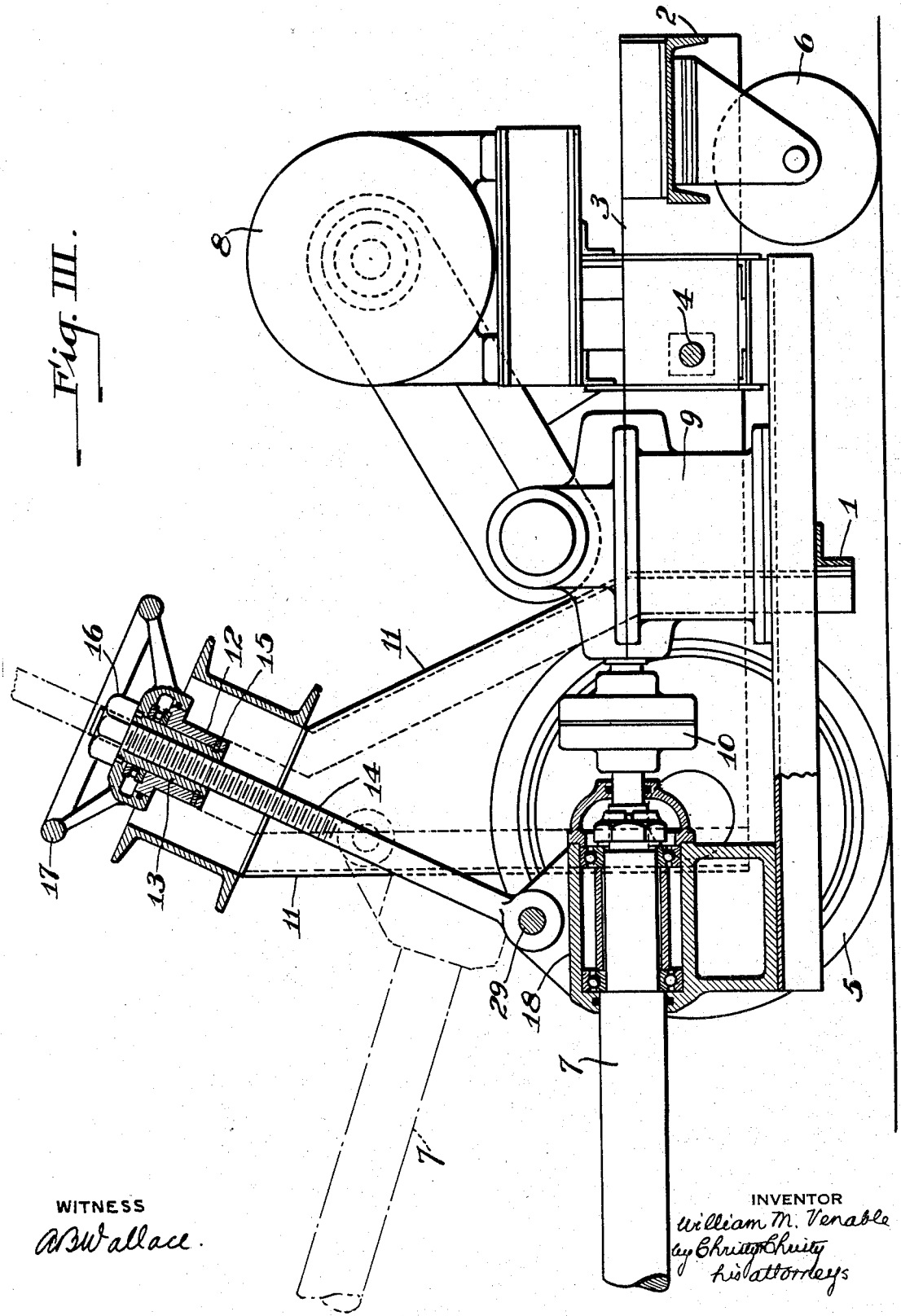

Jan. 13, 1931.  W. M. VENABLE  1,788,554
CONVEYING APPARATUS
Filed April 18, 1929   3 Sheets-Sheet 3
Fig. IV.
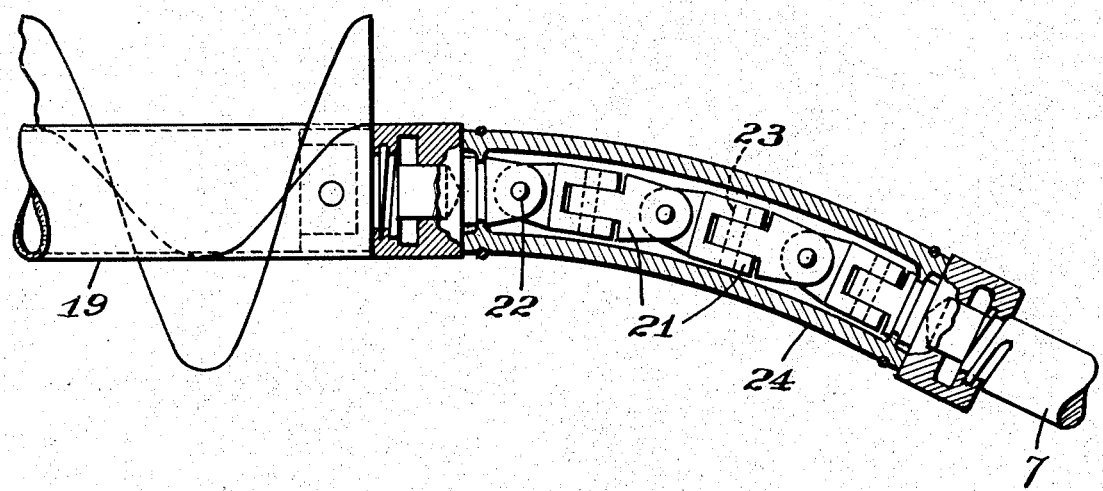
Fig. V.
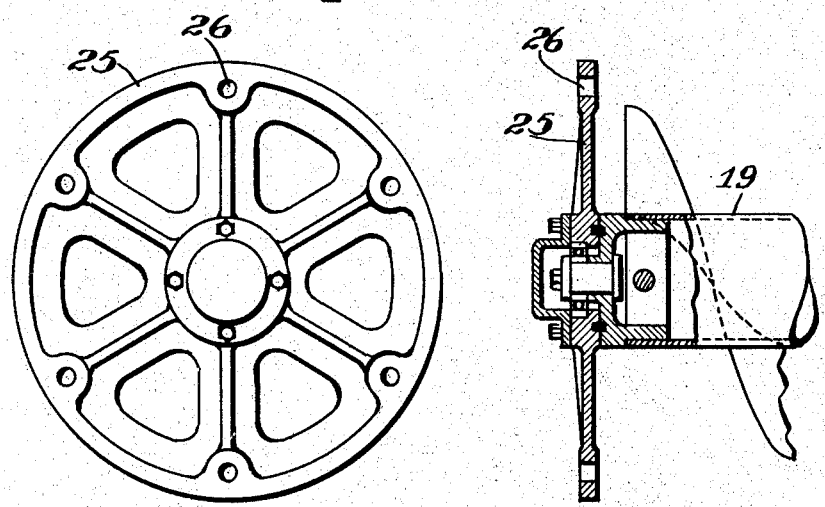
WITNESS
A B Wallace
INVENTOR
William M. Venable
by Christy & Christy
his attorneys Patented Jan. 13, 1931

1,788,554

UNITED STATES PATENT OFFICE

WILLIAM M. VENABLE, OF PITTSBURGH, PENNSYLVANIA, ASSIGNOR TO BLAW-KNOX COMPANY, OF BLAWNOX, PENNSYLVANIA, A CORPORATION OF NEW JERSEY

CONVEYING APPARATUS

Application filed April 18, 1929. Serial No. 356,044.

My invention relates to conveying apparatus, and while the conveying apparatus of my invention is applicable for the conveyance of any suitable material, and particularly of any finely divided material stored in bulk, as, for example, grain, I have had primarily in contemplation the conveyance of cement and, specifically, the unloading of railway freight cars in which cement has been stored in bulk for transportation, and in such particular application I shall show and describe it.

In the accompanying drawings Fig. I is a view in plan and Fig. II a view in side elevation of conveyor apparatus of my invention, shown somewhat diagrammatically, in association with a freight car, the unloading of which is the object in view. Fig. III is a view to larger scale, showing partly in vertical section, partly in elevation the truck with the parts immediately borne thereby, which truck, together with the conveyor screw and supplementary supporting means therefor make up the apparatus in its entirety and in its preferred form. Fig. IV is a view in axial section of a flexible connection of suitable form by which the screw conveyor may be united to its drive shaft. Fig. V includes two views of supplementary supporting means for the conveyor screw: one view is in axial section with respect to the supported conveyor screw; the other is a view in elevation.

The apparatus includes the truck and the parts immediately carried thereby, as seen in Fig. III, together with the conveyor screw. The drive shaft for the conveyor screw is carried by the truck and to it the conveyor screw is connected by the flexible connection shown, as has just been said, in Fig. IV.

The truck includes a chassis, of which only the structural elements 1 and 2 appear, and a frame 3 pivoted to the chassis on a transverse and horizontally extending pivot 4. The chassis is sustained upon a pair of wheels 5 arranged toward its forward end and upon a single caster 6 arranged toward its rear end, and, so sustained, the truck is movable over a level surface, forward and backward, and is capable of being turned about as easily as possible. Ordinarily a platform suitably supported will be provided for the proper movement of the truck adjacent the door of a freight car or other place of storage of the material to be conveyed. It will be observed, particularly on considering Fig. I, that the truck is relatively narrow. It is indeed as narrow as it may with convenience be made, to the end that there may be the widest possible range of swing of the conveyor screw within a freight car, without binding of the flexible connection between the screw and its drive shaft, when the apparatus is applied in the unloading of such a car. The front wheels 5 of the truck are preferably spaced apart at a distance no more than sufficient to permit the arrangement between them of the screw-driving mechanism.

The frame 3 carries the rotatable power-driven shaft 7, arranged on its mid-line and projecting from its forward end, and preferably the frame carries also the shaft-rotating apparatus, including a motor 8, a speed reducer 9, and a coupling 10. Motor, speed reducer, and coupling are units which may be purchased ready-made. They are not intrinsically new, and their organization upon the frame of the truck and with shaft 7 is sufficiently indicated in Fig. III of the drawings.

In general, it may be said that a motor suitable for the work primarily in contemplation will have relatively high speed, perhaps as high as 1800 revolutions per minute or even higher, while the conveyor screw will have a speed of perhaps 60 to 90 R. P. M. The speed reduction will accordingly be considerable. The speed at which the conveyor screw is driven will be such as to effect conveyance as rapidly as possible, without raising an excessive amount of dust within the car.

The pivot 4 on which the frame 3 swings is arranged to rearward, and toward its forward end the frame is pivotally engaged by a hanger which, borne by the chassis, is extensible vertically. By such provision the frame may be swung vertically.

From the chassis at the forward end rise supports 11 in which a barrel 12 is pivotally borne on a horizontally and transversely extending axis (30, Fig. II). Within the barrel 12 a sleeve 13 is rotatably mounted, within which sleeve the hanger in the form of a bolt 14 extends. The sleeve 13 is secured against longitudinal movement within the barrel 12 by means of an annular plate 15 which borne by the barrel extends within a groove formed externally upon the sleeve. This plate constitutes a closure of a cell formed by and between barrel and sleeve, of which further mention will be made.

At its lower end the bolt 14 is at 29 pivotally connected to the frame 3; to the upper and screw-treaded end of the bolt a nut 16 is applied. This nut by downward movement makes union with the sleeve 13, so as to constitute with it a rotatable unit; by upward movement the nut is separable from the sleeve. To such end, the nut is arranged above the sleeve and sleeve and nut are equipped with pin and socket interengagement, as shown in Fig. III. The sleeve 13 carries a hand-wheel 17, by the turning of which, when the parts are in engagement, the nut may be turned and the frame 3 swung. The sleeve 13 in its mounting in barrel 12 may be carried on antifriction bearings, such as the ball bearings shown, and these are shown to be contained within a cell or chamber formed by and between barrel and sleeve. This is the chamber of which mention has been made, closed below by plate 15. At its upper end the meeting edges of the two parts between which such chamber is formed are provided with packing. By such provision the ball-bearing chamber is made secure against ingress of dust and dirt.

The turning of the hand-wheel in one direction effects the upward swing of frame 3 and with it the shaft 7; turning in opposite direction allows the frame to swing of its own weight downward, carrying with it shaft 7. In case the shaft is by engagement with the work or otherwise restrained from downward swinging, the turning of the hand-wheel in direction to permit downward swing will allow the interengagement between sleeve and nut to be broken, without strain to any of the parts or danger of breakage.

The parts manifestly are so proportioned that with a minimum of pivotal play the pivot point of bolt 14 to frame 3 moves through an arc of which the pivot pin 4 is the center.

The shaft 7 which projects from the truck is carried upon suitable bearings arranged within a casing 18. Preferably, and as shown in Fig. III, ball bearings are employed, and they engage the shaft at a plurality of points spaced at a substantial interval longitudinally of the shaft. As in the case already alluded to, the casing 18 is by suitable packing closed to the ingress of dust.

The casing 18 is so designed and the shaft coupling 10 is so arranged that the casing 18 may be made removable from the frame 3, and thus, for convenience, the shaft 7 with the casing 18 may be shipped as a part separate from the frame, and may be readily assembled with the frame at the place of service.

The shaft 7 is conveniently made of sufficient length to extend from the truck which stands outside, through the doorway of a freight car, and yet leave sufficient space between truck and car for the proper disposal of the extracted cement, as by gravity through an underlying hopper. And in association with such a hopper other conveying apparatus (not shown) may be provided, to carry the cement as it is delivered to the place where it is to be stored or otherwise disposed of.

The conveyor screw 19 consists of a shaft bearing an outstanding longitudinally propelling blade or blades. These ordinarily will take the form of a single helicoidal blade, such as that diagrammatically shown in the drawings. For the conditions of service which I contemplate the conveyor screw should be as light in weight as is consistent with the strength required of it. The body of the shaft is in fact, formed of a thin-walled tube of the strongest material available.

The flexible coupling 20 by which the conveyor screw 19 is at its inner end united to the outer end of shaft 7 may be of any preferred form. It preferably includes a succession of units 21 pinned together by pivot-pins 22, 23 disposed in a plurality of radial planes with respect to the axis of rotation and contained within a casing 24 of heavy rubber tubing. The terminal units of the succession are screw-threaded, at one end to the shaft 7, at the other end to the conveyor screw 19. The threads all turn in the same direction, to the end that rotation may be transmitted in the direction of union, and separation of the parts may be effected by turning in opposite direction when the motor is at rest.

At its outer end the conveyor screw 19 carries a bearing block 25, which being properly supported becomes effective as a bearing for the screw when ready for service. This block and its mounting upon the conveyor screw are shown in Fig. V.

The bearing block 25 is essentially of disk form, and is somewhat greater in diameter than the over-all diameter of the conveyor screw, to the end that when resting on the floor of a car it shall sustain the rotating screw clear of contact with the floor. Relative rotation of the two parts is facilitated by suitable bearing members, preferably ball bearings, arranged, as in the other cases mentioned, within a dust-proof cell. Peripherally the block is provided with perforations 26 for the securing to it of suspension cords.

When a box car is loaded with cement at a cement plant, the doors on both sides are boarded up to a height of four feet or more and the boarding is faced interiorly with paper. The floor and the sides of the car also are ordinarily faced within with paper to an equal height, of four feet more or less, to make the whole cement-tight. Cement is then run into the car through a chute or pipe, sometimes with the assistance of a certain amount of air mixed with it to make it flow. The ordinary box car is strong enough to hold a load of cement which when the car is first filled may be four feet deep. In transit the body of cement will pack down, and if at the outset it be four feet deep, it will have consolidated, so that when it arrives at its destination it may be three and a half feet deep, more or less. In this compacted condition the body of cement is very firm, and when a cut is sunk in it, the walls of the cut may stand vertical. The mass is tough and not easy to move. When, however, it is once broken up and distributed, it resumes a condition which is almost fluid. The unloading of a car is a very dusty operation, exceedingly hard upon the men who do the work, and it is difficult to persuade men to continue at this work, particularly if they have to enter the car, or if to protect themselves and to avoid breathing-in cement carried in the air they have to wear masks or screens.

It will be remarked that when the apparatus is in position, as indicated in Figs. I and II, the supporting of the block 25 by lines 27 from the car structure has the effect of affording support to the conveyor screw at its outer end.

The mode of use of the apparatus described is sufficiently indicated in Figs. I and II of the drawings. When a car loaded with cement has been stopped and its outer door has been opened, the platform for the truck and the hopper which is to receive the cement are brought to proper position and the boarding which closes the doorway of the car is removed. The conveyor screw is then introduced and is caused to project inward through the doorway and to rest upon the body of cement within. It may then rest in such position as is in Fig. I indicated by broken lines. The pulley blocks 28 are then secured in such positions that by the lines 27 the conveyor screw may be moved about in the car (as is suggested by the full-line showing, Fig. I). The truck then is wheeled to position and the conveyor screw is by the flexible coupling 20 united with the shaft 7. The machine is then set in operation. Rotation of the screw will effect delivery of cement through the doorway; the rotating screw will tend always to sink itself in the cement, and by means of the lines 27 the screw may be moved about, and by means of the hand-wheel 17 the shaft 7 may be swung, so that as rotation continues the body of cement may gradually be extracted from the car. An attendant with a shovel may heap small and inaccessible remainders into such position as to be taken up by the screw. Contact of block 25 with the boarding will keep the blade ends of the rotating conveyor screw from striking the floor and walls of the car.

In Fig. I it appears that the relatively narrow shape of the truck is advantageous in allowing the conveyor screw to reach the farthest corners. Fig. I further shows that, the conveyor screw being initially placed in one vertical plane, it may as it operates be caused to swing (the flexible connection 20 permitting) horizontally, by proper positioning of pulleys 28, and by proper hauling upon line 27.

As the emptying of the car progresses the truck will be shifted on the platform, advanced and retracted with respect to the opening; the conveyor screw will adjust itself to different angular positions with respect to its drive shaft 7; the pulleys 28 will be variously placed, and the lines 27 will be used to haul and to ease off, allowing gravity to be effective upon the conveyor screw, all as will be clearly understood.

While the whole operation of unloading the car may be accomplished with the apparatus shown and described, it may be a matter of convenience, if the platform be small and if the truck may not be moved far backward and away from the doorway of the car, to dispense with the flexible connection 20, and to mount a shorter conveyor screw immediately and rigidly upon its driving shaft 7. Manifestly, a plurality of conveyor screws of varying lengths may be provided, each capable of being connected to the drive shaft 7, either directly and rigidly, or indirectly through such a flexible coupling as 20, and thus the apparatus may be adapted minutely to varying conditions under which operation may be carried out.

As I said at the outset, my invention has been developed in considering the problem of unloading cement from railway cars. Manifestly, it is of wider applicability. It may be employed in conveying other finely-divided material which is stored in bulk, as, for example, sand and grain, and it may be employed in conveying finely-divided material from storage rooms, bins, and stock piles, and of course from the chambers of vehicles generally.

As the conveyor screw descends from such elevated position as is indicated in dotted lines in Fig. II to the full-line position, the frame 3 of the truck will by the turning of the hand-wheel 17 allow the shaft 7 to swing from its upwardly inclined position toward the horizontal. If in this operation the frame be swung downwardly too rapidly, the pin-and-slot connection between nut 16 and sleeve 12 will separate, allowing the conveyor screw to rest free of strain upon the body of cement, and still be responsive to rotative drive. When thereafter the conveyor screw has sunk further, or the frame 3 has been swung upward, the connection will close again, that the conveyor screw may be carried to other desired position.

It will be observed that the weight of the conveyor screw is, through the hanger bolt 14, carried to the supports 11, and rests substantially directly upon the forward wheels 5.

I claim as my invention:

In mobile apparatus for extracting finely divided material from bins or other containers, a truck including a chassis and a frame pivotally borne thereon, a rotatable conveyor shaft borne by said frame, said shaft extending from said frame and terminating at an interval beyond the body of said truck, and means for tilting the frame, the frame-tilting means including a barrel mounted on the chassis, a hanger bolt to which the frame is secured extending through said barrel, a nut on said bolt, a sleeve borne rotatably on said barrel, said nut and sleeve being united in a vertically separable union.

In testimony whereof I have hereunto set my hand.

WILLIAM M. VENABLE.